(No Model.) 2 Sheets—Sheet 1.
C. W. HIGBY.
CORSET.
No. 294,620. Patented Mar. 4, 1884.
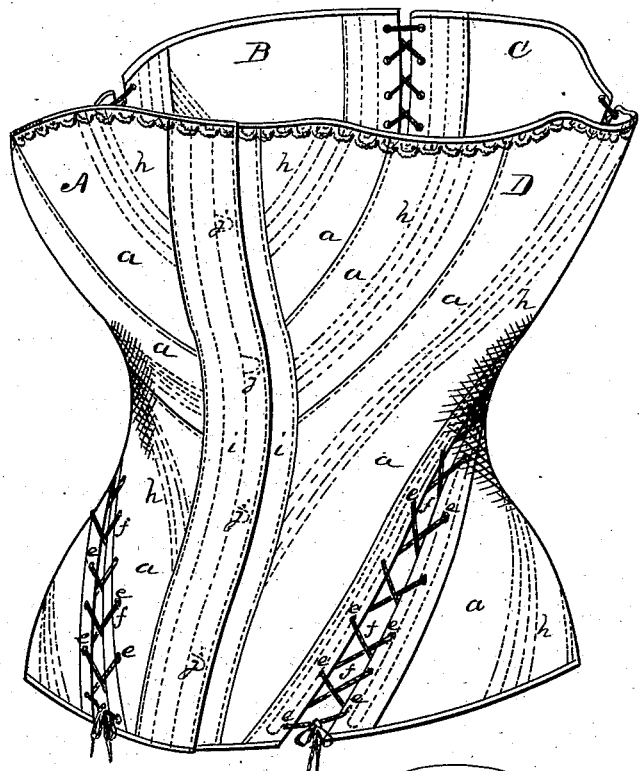
Fig. 1.
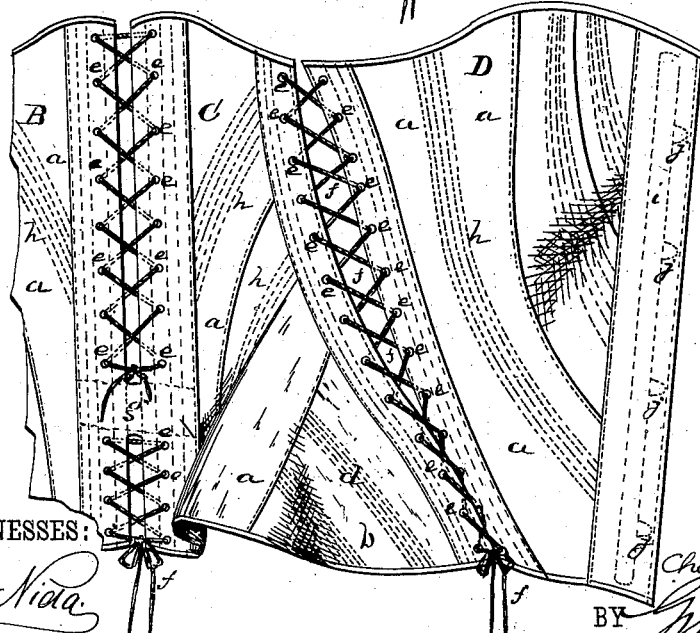
Fig. 2.
WITNESSES:
Chas. Nida.
Julian Anderson.
INVENTOR
Charles W. Higby
BY 
ATTORNEY

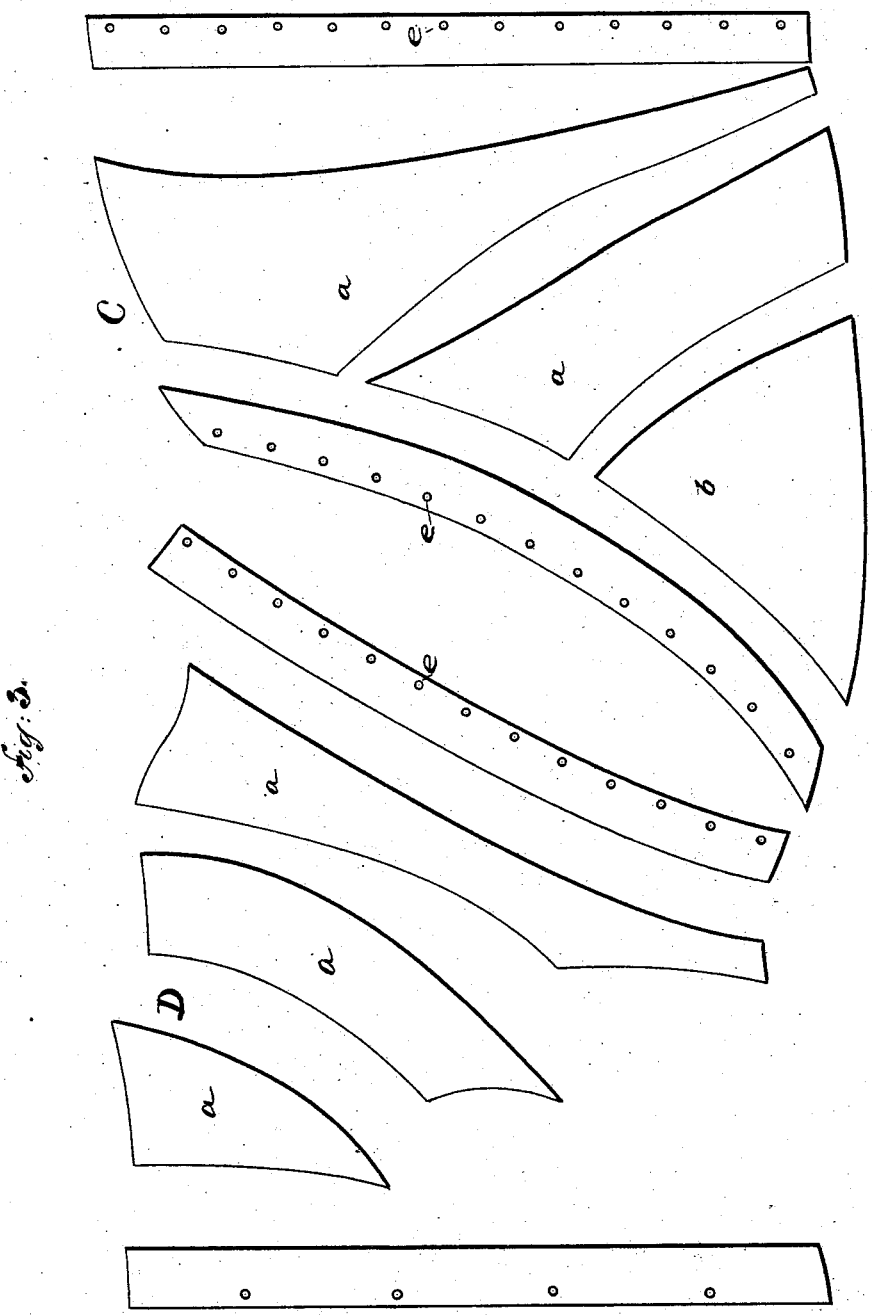

UNITED STATES PATENT OFFICE.

CHARLES W. HIGBY, OF JACKSON, MICHIGAN.

CORSET.

SPECIFICATION forming part of Letters Patent No. 294,620, dated March 4, 1884.

Application filed September 7, 1883. (No model.)

*To all whom it may concern:*

Be it known that I, CHARLES W. HIGBY, of Jackson, Jackson county, Michigan, have invented a new and useful Improvement in Corsets; and I do hereby declare the following to be a full, clear, and exact description of the same, reference being had to the accompanying sheet of drawings, forming a part of this specification.

This invention is in the nature of an improvement in corsets; and the invention consists in a four-part corset with diagonal sections, constructed and arranged in the manner hereinafter more particularly described, shown, and claimed.

In the accompanying sheet of drawings, Figure 1 is a perspective view of my corset; Fig. 2, a rear side view of the same; Fig. 3, detail views of several sections.

Similar letters of reference indicate like parts in the several figures.

The purpose of this invention is to construct a corset that will perfectly fit the person, admit of ready adjustment for that purpose, yield readily to the movements of the body, and yet afford all the support required without discomfort. To that end I construct my corset in four parts A, B, C, and D, each part being composed of several pieces or sections, a, sewed together, and the several parts in this way formed, having the shape or substantially the shape indicated in Figs. 1 and 2 of the drawings. The sections a, composing the parts A and D of the corset, extend from the upper edge of the corset diagonally toward the front edge of the same, and the sections composing the parts B and C of the corset extend diagonally from toward the front edges of the last two named parts toward their rear edges. Into the parts B and C, I insert gores similar to gore b, shown in part C, the like gore in part B being covered in the drawings by other parts of the corset, these gores being stiffened to some extent by cordings d, bones, or in any suitable manner, extending diagonally toward the front. Into the rear edge of the part A, and into the two edges of the part B, and the two edges of the part C, and the rear edge of the part D, are inserted ordinary eyelets, e. By means of these eyelets and the lacing-cords f, the several parts A, B, C, and D are united. As an additional means of uniting the parts B and C, the usual zone common in corsets may be employed. This zone may also be used to unite the part A to the part B and the part C to the part D, if desired, in addition to the lacing-cords before mentioned. Into the several sections of the several parts A, B, C, and D are inserted bones h, which bones extend diagonally in a manner similar to the diagonal direction of the several sections into which the bones are inserted. In the front edges of the parts A and D suitable pockets are placed for the reception of the ordinary busks, i.

A corset, when constructed substantially in the manner hereinbefore described, is easily adjusted to the form of the wearer by means of the lacing-cords f, that unite the part A to the part B and the part C to the part D.

The adjustment to the person by means of these cords once having been made, no further adjustment is required. The ordinary lacing-cords, f, at the back of the corsets, uniting the parts B and C together, are employed, as in ordinary corsets, to tighten the corset about the person where the corset is held by the clasps j.

The special advantage derived from this construction of the corset is that it can be easily made to fit the wearer or conform itself to the shape of the person with much certainty and accuracy by means of the lacing-cords uniting the several parts; and in addition the entire absence of anything like rigidity at the junction of each part with the other causes the parts at such places to act substantially as hinges, enabling the corset to yield with perfect freedom to every movement of the body, and the construction of each part of the corset with a series of diagonally-placed sections and diagonal bones placed in the sections adds greatly to the strength of the corset, and at the same time permits the corset to conform easily to the shape of the body and to form the requisite support without undue stiffness or inflexibility. The gores are so located in the parts B and C as to cover the crowns of the hips, and thereby enable the corset to fit over those parts of the body without any special fashioning of the corset for that purpose.

Having now described my invention, what

I claim as new, and desire to secure by Letters Patent, is—

1. A corset composed of four parts, A, B, C, and D, each of said parts consisting of a series of diagonal sections, $a$, with diagonal bones $h$ placed therein, the parts being united by lacing-cords $f$, all constructed and arranged in the manner hereinbefore particularly described and set forth.

2. A corset with the four parts A, B, C, and D composed of the pieces $a$ and gores, as shown, said parts being adapted to be united by the lacing-cords $f$, as and for the purpose described.

CHARLES W. HIGBY.

Witnesses:
JULIAN McV. ANDERSON,
G. M. PLYMPTON.